(12) United States Patent
Nicholson

(10) Patent No.: US 8,329,125 B2
(45) Date of Patent: Dec. 11, 2012

(54) FLUE GAS RECIRCULATION SYSTEM

(75) Inventor: Stewart Nicholson, Doylestown, PA (US)

(73) Assignee: Primex Process Specialists, Inc., Doylestown, PA (US)

( * ) Notice: Subject to any disclaimer, the term of this patent is extended or adjusted under 35 U.S.C. 154(b) by 55 days.

(21) Appl. No.: 13/095,081

(22) Filed: Apr. 27, 2011

(65) Prior Publication Data

US 2012/0275976 A1 Nov. 1, 2012

(51) Int. Cl.
*B01D 53/50* (2006.01)
*B01D 53/34* (2006.01)
*B01D 53/74* (2006.01)
*G05B 13/00* (2006.01)
*G05D 7/00* (2006.01)

(52) U.S. Cl. ............... 423/210; 423/242.1; 423/244.01; 423/215.5; 423/DIG. 5; 422/105; 422/110; 422/111; 422/168; 422/169

(58) Field of Classification Search .................. 423/210, 423/242.1, 244.01, 215.5, DIG. 5; 422/105, 422/110, 111, 168, 169
See application file for complete search history.

(56) References Cited

U.S. PATENT DOCUMENTS

| | | | |
|---|---|---|---|
| 2,883,333 A | 4/1959 | Oliver |
| 3,020,240 A | 2/1962 | Lockett, Jr. |
| 4,239,711 A | 12/1980 | Dick et al. |
| 4,273,750 A | 6/1981 | Hollett, Jr. et al. |
| 4,322,224 A | 3/1982 | Roth |
| 4,335,660 A | 6/1982 | Maloney et al. |
| 4,728,282 A | 3/1988 | May |
| 5,034,030 A | 7/1991 | Miller et al. |
| 5,195,883 A | 3/1993 | Hanna et al. |
| 5,326,254 A | 7/1994 | Munk |
| 5,441,000 A | 8/1995 | Vatsky et al. |
| 5,488,916 A | 2/1996 | Bozzuto |
| 5,603,906 A | 2/1997 | Lang et al. |
| 5,746,144 A | 5/1998 | Breen et al. |
| 5,795,548 A | 8/1998 | Madden et al. |
| 5,809,913 A | 9/1998 | Kramer et al. |
| 6,168,709 B1 | 1/2001 | Etter |
| 6,290,921 B1 | 9/2001 | Kuivalainen et al. |
| 6,293,787 B1 | 9/2001 | Reyes |
| 6,357,367 B1 | 3/2002 | Breen et al. |
| 6,383,462 B1 | 5/2002 | Lang |
| 7,350,471 B2 | 4/2008 | Kalina |
| 7,585,476 B2 | 9/2009 | Downs et al. |
| 7,647,204 B2 | 1/2010 | Hanson et al. |
| 7,736,608 B2 | 6/2010 | Eiteneer et al. |
| 7,776,297 B2 | 8/2010 | Cichanowicz |
| 7,927,568 B2 * | 4/2011 | Fan et al. ............... 423/220 |
| 2006/0032377 A1 | 2/2006 | Reddy et al. |
| 2007/0243119 A1 * | 10/2007 | Downs et al. ............ 423/210 |
| 2009/0271039 A1 | 10/2009 | Richman et al. |
| 2010/0077944 A1 | 4/2010 | Slavejkov et al. |
| 2010/0147146 A1 | 6/2010 | Petty |

* cited by examiner

*Primary Examiner* — Timothy Vanoy
(74) *Attorney, Agent, or Firm* — Gregory J. Gore

(57) ABSTRACT

Recirculation of treated flue gas either independently or as a substitute for ambient air at specific points of ingress in a flue gas treatment system is provided to stabilize approach temperature and related parameters such as reagent consumption and pollution admission rate preventing both the accumulation of particulate matter and excessive corrosion associated with ambient air ingress. This recirculation provides a desired turbulence within remote regions of the flue gas treatment system to reduce the amount of particulate matter that may otherwise settle and accumulate in the absorber vessel or other areas of the system thereby causing particulate matter to be conveyed to the particulate removal device.

20 Claims, 2 Drawing Sheets

FLUE GAS RECIRCULATION SYSTEM

FIELD OF THE INVENTION

This invention relates to air quality control systems, the principal purpose of which is to remove pollutants from the flue gas generated during combustion of solid fuels such as coal, wood products and municipal solid waste. More specifically, this invention relates to dry, circulating dry, semi-dry or spray dryer type flue gas treatment (hereinafter "DFGT") systems, also commonly referred to as dry scrubber systems.

BACKGROUND OF THE INVENTION

The combustion of solid fuels at power generating and waste disposal facilities commonly produces air pollutants such as sulfur dioxide, hydrogen chloride and mercury. In a typical DFGT process, an absorber vessel is located downstream of the combustion process into which the gaseous product of combustion ("flue gas") and a reagent, such as calcium hydroxide, are directed and intermingled. Pollutants then react with the reagent in the absorber vessel to produce solid particles suspended in the flue gas stream. Substantially all of the solid particles are then removed from the flue gas in a particulate removal device located downstream of the absorber vessel such as a fabric filter or electrostatic precipitator.

In some DFGT systems, water is added to the flue gas concurrently with the reagent to enhance the reaction rate in the absorber vessel. This additional water preferably evaporates fully within the absorber vessel, thereby cooling and humidifying the flue gas. The difference between the dry bulb temperature and adiabatic saturation temperature of the flue gas is thereby reduced during this evaporation phase. This difference may be measured at the absorber vessel exit and is commonly referred to as the "approach to saturation temperature" or simply "approach temperature". Several important aspects of DFGT process performance such as pollutant emission rate, reagent consumption and corrosion rate have been shown to correlate with approach temperature. Consequently, numerous factors affecting approach temperature have been studied in the prior art.

Recent developments in instrumentation technology and analysis techniques have enabled several new factors affecting approach temperature to be confirmed and quantified, one of which is ambient air ingress to DFGT system components such as the absorber vessel. The absorber vessel is under vacuum during normal DFGT system operation; therefore, ambient air tends to enter the vessel through any open orifice. Means to permit and control ambient air ingress into remote regions of the absorber vessel is a common feature of DFGT systems in the prior art. Ambient air may thus be permitted to enter certain remote regions of the absorber vessel continuously, the intended purpose of which is to suspend and convey particulate matter which may otherwise settle by gravity and accumulate in these regions. Nevertheless, heavy particulate matter may still accumulate in these regions and, as a consequence of opening certain valves to permit the discharge of this accumulated matter, additional ambient air may also be permitted to enter certain regions of the absorber vessel. In both the continuous and intermittent air ingress cases, as the cooler ambient air mixes with the humid flue gas in these regions, the localized gas temperature falls below the adiabatic saturation point causing moisture to condense into fine liquid droplets. The liquid droplets agglomerate with the particulate matter to form a semi-solid adhesive mixture that settles and accumulates on the absorber vessel and downstream component surfaces. This accumulation may place unanticipated loads on DFGT system structural components and disturb or impede flue gas flow, thereby interfering with particulate removal and increasing induced draft fan power consumption.

Furthermore, it is now recognized that moisture condensation stemming from the cooling effect of ambient air ingress substantially accelerates corrosion in DFGT systems. The condensed liquid entrained with the solid particles is typically a saturated aqueous salt solution. The corrosion of surfaces onto which this solution is deposited may compromise structural integrity, necessitate costly repairs and reduce the useable life of the DFGT system.

Finally, in addition to the cooling effect of ambient air ingress, the ambient air humidity is also substantially lower than the average flue gas humidity within the absorber vessel. Therefore, during periods of ambient air ingress, this humidity difference further tends to destabilize approach temperature with consequent adverse effects on pollutant emission rate, reagent consumption and particulate removal efficiency.

SUMMARY OF THE INVENTION

The present invention has been devised to preserve the purpose in the prior art of intentional ambient air ingress to DFGT systems while mitigating its adverse consequences. Generally speaking, this system enables the recirculation of treated flue gas either independently or as a substitute for ambient air at specific points of ingress to the DFGT system, thereby stabilizing approach temperature (and related parameters such as reagent consumption and pollutant emission rate) and preventing both the accumulation of particulate matter and excessive corrosion associated with ambient air ingress. This recirculation is accomplished by extracting a fraction of treated flue gas from the induced draft fan outlet and directing it to the absorber vessel or other areas of the DFGT system at a controlled rate through an insulated duct. This recirculation provides the desired turbulence within remote regions of the DFGT system to reduce the amount of particulate material that may otherwise settle and accumulate in these regions, thereby causing particulate matter to be conveyed to the particulate removal device. Insofar as critical properties such as temperature and humidity of the recirculated flue gas are approximately equal to those of flue gas in the absorber vessel, the intended purpose of ambient air ingress is thus preserved while its adverse effects are substantially eliminated.

Furthermore, in one embodiment of the present invention, removal of accumulated particulate matter directly from the absorber vessel is enabled without permitting ambient air ingress. Particulate matter tends to accumulate on the absorber vessel wall due to localized approach temperature deviations for reasons other than ambient air ingress, such as temperature control system failures, combustion process upsets, boiler tube leaks and inadequate insulation. In these instances, accumulation of particulate matter continues until other forces, such as gravity or flue gas impingement, cause larger fragments to break away from the absorber wall. These larger fragments may be too heavy to be conveyed in the gas stream toward the particulate removal device; therefore some fragments accumulate in the absorber vessel and must be discharged by means other than the particulate removal device. In the prior art, those means typically include a conical hopper with a discharge isolation valve. This isolation valve is opened fully on an intermittent basis to permit the discharge of fragments by gravity for disposal, during which ambient air enters the absorber vessel. Whereas, in accordance with one embodiment of the invention, a transition piece containment vessel (hereinafter "accumulator") is employed, to which are attached two isolation valves in series. In this embodiment, one of the two isolation valves is always closed, thereby substantially eliminating ambient air ingress while permitting the intermittent discharge of heavy fragments by gravity for disposal. In yet another embodiment of the invention, the portion of the recirculated flue gas may be redirected to other points along the flue gas stream for example at the particulate removal device having a receptacle for the accumulation of particulate matter removed from the flue gas stream. The ducting and recirculated flue gas may be directed to either the absorber vessel or the particulate removal device or both, or any other point or points along the path of the flue gas stream.

More specifically, the Applicant has invented a control system for mitigating the adverse consequences related to ambient air ingress in a DFGT system that includes an absorber vessel and provisions, such as a hopper located at the base of the absorber, for receiving settled particulate matter from the flue gas. The flue gas is carried from the vessel through ducting (hereinafter "flue gas conduit") to a downstream device for removing particulate matter entrained in the flue gas. The flue gas conduit then continues from the particulate removal device to a fan in the conduit which induces the flue gas to flow through the absorber vessel and particulate removal device. A recirculation duct is in communication with the flue gas conduit downstream of the fan that enables flue gas to flow through the recirculation duct back to points upstream of the fan. The recirculation duct is insulated to minimize heat loss. A damper located in the recirculation duct is provided to control and maintain the flue gas flow rate at a volume sufficient to suspend and convey particulate matter which may otherwise settle by gravity in the DFGT system.

In one embodiment of the invention, an accumulator is provided at the base of the absorber vessel that includes an inlet isolation valve at the top of the accumulator at the junction with the vessel. A discharge isolation valve at the base of the accumulator is operable between open and closed positions for releasing matter from the accumulator. Similarly, the inlet isolation valve regulates the admission of matter from the vessel into the accumulator. These accumulator isolation valves are always in opposing operative positions with the discharge isolation valve being open only once the inlet isolation valve is closed and vice versa. During an accumulator discharge cycling period, the isolation valves are repeatedly opened and closed at synchronized time intervals for a predetermined cycling period. Cycling periods may be initiated in timed sequence or after the accumulator has retained a specific amount of particulate matter. An isolation valve is located in the recirculation duct to interrupt the flow of recirculated flue gas to the absorber vessel for maintenance and during the accumulator cycling. The recirculation duct is in communication with the absorber vessel through connection to the accumulator.

It is therefore the main object of the invention to mitigate the adverse consequences related to ambient air ingress in a DFGT system such as pollutant emission rate variations and excessive reagent consumption. It is another object of the present invention to reduce other adverse effects of ambient air ingress on DFGT system operation such as particulate matter accumulation and corrosion. It is a further object of the invention to provide a control system in which heavy fragments of particulate matter settled in the absorber can be systematically removed without the admittance of ambient air to the absorber vessel that may otherwise adversely affect approach temperature, particulate matter accumulation and corrosion in the DFGT system.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

Figure 1:
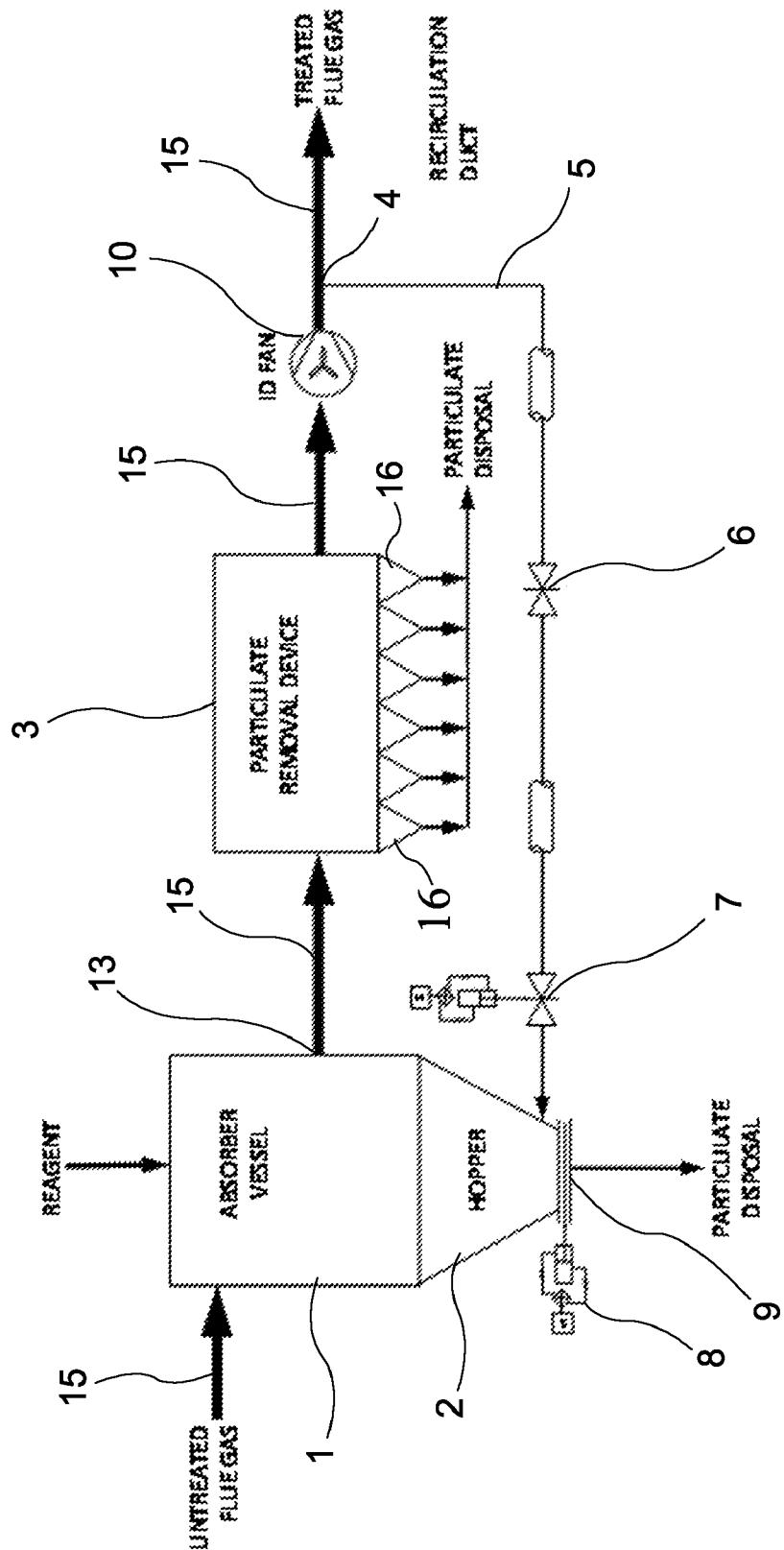
FIG. 1 is a schematic illustration of a dry flue gas treatment process utilizing the control system of the invention.

Referring now to FIG. 1, a DFGT system is illustrated which depicts one embodiment of the present invention. In the previously described DFGT process, untreated flue gas is introduced into an absorber vessel 1 where it is brought into contact with a reagent that is injected into the flue gas stream. Pollutants react with the reagent in the absorber vessel to produce solid particulate matter suspended in the flue gas stream which travels along its path directed by flue gas conduit 15 as it is processed. The flue gas stream containing particulate matter then exits the vessel at the absorber outlet 13 and passes through a flue gas conduit to a fabric filter or electrostatic precipitator unit 3 to remove the particulate matter from the flue gas stream for disposal. Passage of the flue gas stream from the absorber vessel inlet through the absorber vessel and particulate removal device 3 is induced by a fan 10 located downstream of the filter unit through a flue gas conduit 15 shown in bold. The fan then exhausts the treated flue gas along the flue gas conduit for further treatment or release into the atmosphere.

A recirculation duct 5 is connected to the flue gas conduit downstream of the fan 4. The recirculation duct carries treated flue gas back to the location(s) within the absorber vessel at which particulate matter accumulates, such as a conical hopper 2 as illustrated in this diagram or similar receptacle, hereinafter referred to as "hopper". The recirculation duct 5 is insulated to maintain flue gas temperature within the duct above the adiabatic saturation temperature and, preferably, approximately equal to that of the flue gas in the absorber vessel. The duct insulation may, for example, be a mineral fiber-type in accordance with ASTM C553-02, Type II graded for 450° F. minimum. Insulation thickness may be 75 mm with metal jacketing of 0.4 mm minimum using aluminum or stainless steel with a moisture barrier. The flow rate of flue gas in the recirculation duct is controlled by a damper 6. Isolation valve 7 in the recirculation duct is employed to interrupt the recirculation flow as may be required for maintenance purposes. The permitted flow of recirculated flue gas is thereafter introduced to the hopper 2 in a volume sufficient to suspend and convey a substantial portion of the particulate matter which may otherwise settle by gravity at that location. Nonetheless, a certain amount of matter is not carried away from the absorber vessel through the flue gas conduit but instead settles by force of gravity in the absorber vessel. The region of the absorber vessel into which particulate matter settles, such as hopper 2, includes a discharge port 9 through which accumulated particulate matter may be discharged for disposal by opening valve 8 on an intermittent basis. The particulate removal device includes a second receptacle 16 for containing filtered particulate matter prior to its disposal.

The above-described various components are well known to those of skill in the art in this field and do not require further description for one to practice the invention. The ducting and associated fittings, valves, supports and insulation to accomplish the invention are known. Thus, the ducting and associated fittings and components in direct contact with the flue gas should be suitable for appropriate flue gas pressures and temperatures ranging respectively, for example, from −100 mbar to +50 mbar and up to 150° C. on a continuous basis with temporary excursions up to 250° C. Also, the various duct joints and connections should be properly secured and sealed to provide airtight connection under these conditions. The particular selection, design and placement of the duct supports and hangers are choices in constructing the invention left to the individual design engineer.

Figure 2:
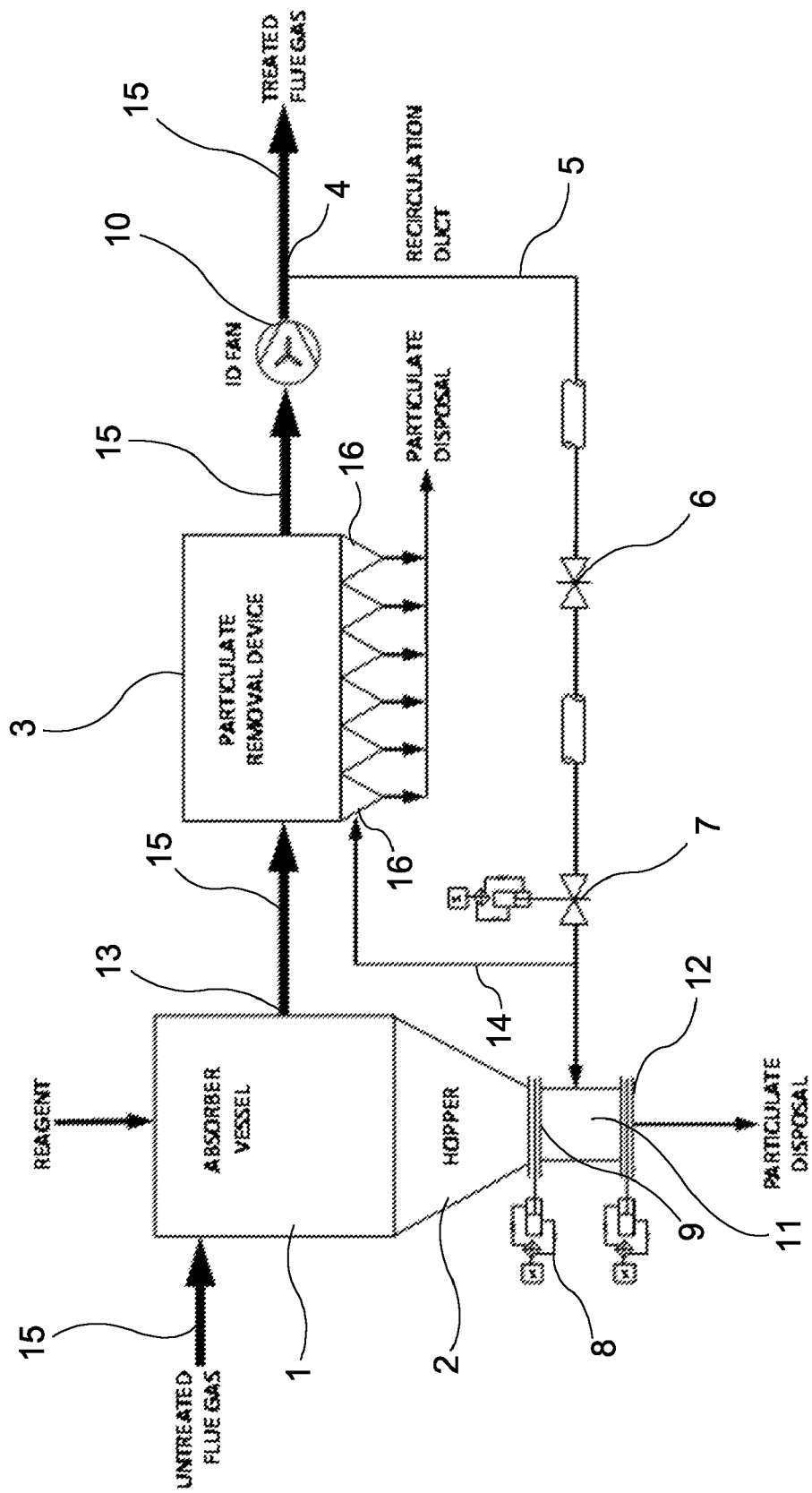
FIG. 2 is a schematic illustration of a second embodiment of the invention.

Referring now to FIG. 2, an alternate embodiment of the invention is shown which operates generally as described above except that an accumulator 11 has been added to the discharge port 9 at the location within the absorber vessel at which particulate matter accumulates, such as a conical hopper 2 as illustrated in this diagram and hereinafter referred to as "hopper". Entrance to and discharge from the accumulator 11 is controlled by valves 8 and 12 respectively. This configuration permits the intermittent discharge of heavy particulate matter from the hopper that may otherwise settle by gravity in the absorber vessel. In this embodiment, flue gas is recirculated indirectly into the hopper 2 through the body of the accumulator 11. Valves 7 and 8 are normally open while discharge valve 12 is normally closed. At a programmed interval determined by observed material accumulation rate, isolation valve 7 closes after which inlet isolation valve 8 closes concurrent with the opening of discharge valve 12. Valves 8 and 12 then cycle in opposing positions to enable solid particulate matter to be discharged from the hopper. The particulate removal device 3 includes a second receptacle 16 for collecting solid products of the absorber reaction and other particulate matter that is removed from the flue gas stream. The cycling frequency and period are determined by the material accumulation and discharge rates required by the absorption process. At the end of the accumulator discharge cycling period, discharge valve 12 closes as isolation valve 7 and inlet isolation valve 8 open. The initiation of the accumulator discharge cycling is determined by preset timing or by sensors in the accumulator 11 indicating when a specific amount of retained matter has been reached. FIG. 2 also shows additional ducting 14 which may be employed to redirect a portion or all of the flue gas to the particulate removal device receptacle 16 with the possible use of appropriate valves (not shown). It should be understood that the redirection of flue gas to other points along the path of the flue gas stream is also contemplated to be within the scope of the invention.

In both embodiments described above, the volume of recirculated flue gas is adjusted by means of the damper 6 to optimize evacuation of particulate matter. In both cases, the recirculation duct 5 is insulated to maximize heat retention and also is sized to maintain a gas flow rate in the lower region of the absorber vessel hopper that is sufficient to convey fine particulate matter to the absorber outlet 13 into the flue gas conduit.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A control system for mitigating the adverse effects of ambient air ingress to a DFGT system comprising:
   an absorber vessel for enabling the reaction of reagents with pollutants in the flue gas generated from a combustion process;
   a flue gas conduit for carrying a flue gas stream from said absorber vessel;
   a fan for inducing the flow of said flue gas and products of reaction through said absorber vessel and flue gas conduit; and
   a recirculation duct in communication with said flue gas conduit downstream of said fan for directing a portion of said flue gas to said absorber vessel.

2. The control system of claim 1 further including a particulate removal device in said flue gas conduit for removing solid products of said reaction and other particulate matter suspended in said flue gas stream.

3. The control system of claim 2 wherein said particulate removal device includes a second receptacle for collecting the solid products of said reaction and other particulate matter that is removed from said flue gas stream, and further including ducting which carries recirculated flue gas to said second receptacle.

4. The control system of claim 1 wherein said absorber vessel includes a first receptacle for collecting the solid products of said reaction and other particulate matter that is not suspended in said flue gas stream.

5. The control system of claim 4 further including a flow control device located in said recirculation duct for adjusting the flow rate of said recirculated flue gas.

6. The control system of claim 5 further including a gravity-fed accumulator at the base of said first receptacle, interposed between said receptacle and a discharge isolation valve, for storing an amount of particulate matter received from said first receptacle.

7. The control system of claim 6 further including an airtight inlet isolation valve located between said first receptacle and said accumulator operable between open and closed positions for admitting particulate matter from said first receptacle into said accumulator.

8. The control system of claim 7 wherein said discharge isolation valve is operable between open and closed positions for releasing particulate matter from said accumulator.

9. The control system of claim 8 wherein said inlet isolation valve and discharge isolation valve are always in opposing operative positions, said discharge isolation valve being open only when said inlet isolation valve is closed and vice versa.

10. The control system of claim 9 further including an accumulator discharge cycling period during which time said isolation valves are repeatedly opened and closed at synchronized timed intervals for a predetermined cycling period.

11. The control system of claim 10 further including a plurality of cycling periods, each period being initiated after said accumulator has retained a specified amount of particulate matter.

12. The control system of claim 11 further including an isolation valve located in said recirculation duct operable between open and closed positions whereby said isolation valve is closed to stop the flow of recirculated flue gas to said receptacle.

13. The control system of claim 12 wherein said recirculation duct is in communication with said receptacle through connection to said accumulator and wherein said isolation valve is closed during said accumulator cycling period.

14. The control system of claim 4 wherein said first receptacle is a hopper.

15. The control system of claim 5 wherein said flow control device is a damper.

16. The control system of claim 1 further described in that said recirculation duct is thermally insulated against heat loss to maintain a sufficiently high temperature to significantly reduce condensation in the absorber.

17. A method of controlling downstream condensation in a spray absorber having a downstream combustion flue gas stream comprising the steps of:
  treating said combustion flue gas stream with a spray sorbent in an absorber vessel having a particulate-accumulating receptacle located at a base thereof;
  filtering said flue gas flow by drawing said combustion gas through a filter with a draft-inducing fan thereby creating a treated gas stream exiting said fan; and
  recirculating a portion of said treated gas stream back to said absorber vessel receptacle with sufficient velocity to create an aerodynamic turbulence within said receptacle to mitigate the settling of particulate matter therein.

18. The method of claim 17 including the step of regulating the rate of flow of said recirculated flue gas by a flow-control device located in an insulated recirculation duct operably connected between said receptacle and said treated gas stream downstream of said fan.

19. The method of claim 18 further including an accumulator at the bottom of said receptacle having an inlet isolation valve operable between open and closed positions for controlling the receipt of matter from said receptacle and a discharge valve for controlling the discharge of retained matter from said accumulator, said valves being always in opposed positions with said discharge valve being open only when said inlet isolation valve is closed and vice versa.

20. The method of claim 19 further including the step of opening and closing said valves in repeating cycles during an accumulator discharge cycle period after said accumulator has retained an amount of matter.

* * * * *